No. 711,592. Patented Oct. 21, 1902.
F. SCHMITZ.
RUNNING GEAR FOR VEHICLES.
(Application filed Mar. 5, 1902.)
(No Model.) 2 Sheets—Sheet 1.

Witnesses: Chas. O. Shirvey, S. Bliss.

Inventor: Frank Schmitz, by H. Bitner, Atty.

No. 711,592. Patented Oct. 21, 1902.
F. SCHMITZ.
RUNNING GEAR FOR VEHICLES.
(Application filed Mar. 5, 1902.)
(No Model.) 2 Sheets—Sheet 2.
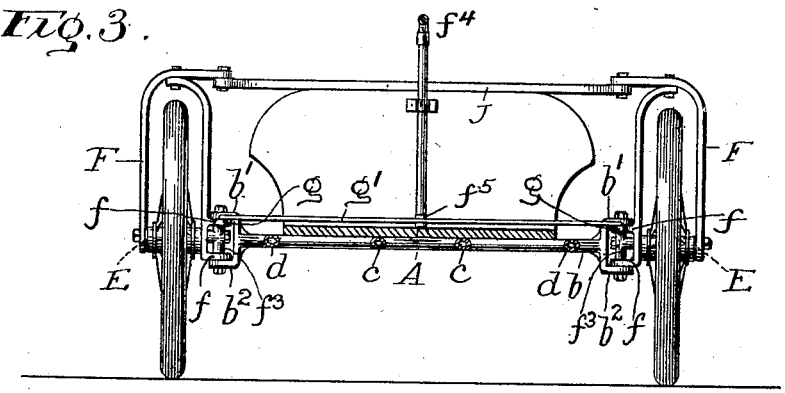
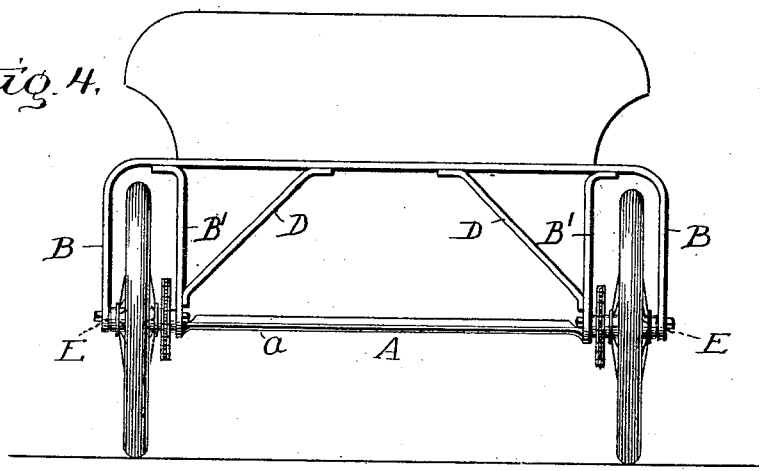
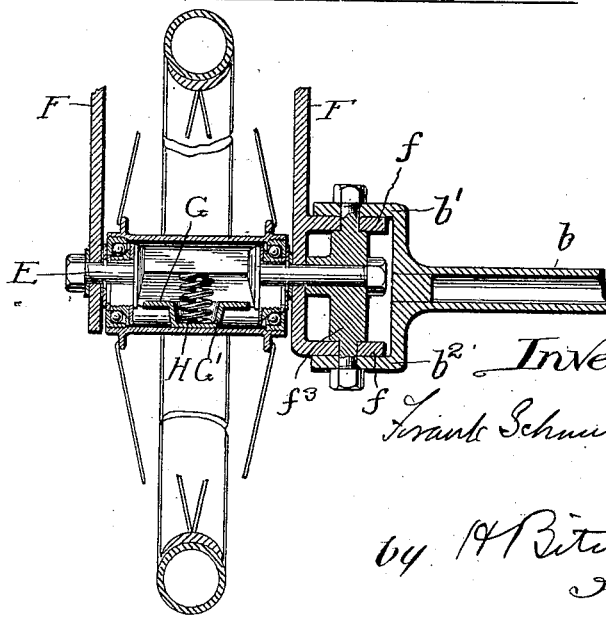
Witnesses:
Chas. O. Survey
S. Bliss
Inventor:
Frank Schmitz
by H. Bitner
Atty.

UNITED STATES PATENT OFFICE.

FRANK SCHMITZ, OF CHICAGO, ILLINOIS.

RUNNING-GEAR FOR VEHICLES.

SPECIFICATION forming part of Letters Patent No. 711,592, dated October 21, 1902.

Application filed March 5, 1902. Serial No. 96,740. (No model.)

*To all whom it may concern:*

Be it known that I, FRANK SCHMITZ, a citizen of the United States of America, residing at Chicago, in the county of Cook and State of Illinois, have invented certain new and useful Improvements in Running-Gears for Vehicles, of which the following is a specification.

My invention relates to improvements in running-gears for vehicles, its object being to produce a structure which shall not only be light and strong, but which shall at the same time accommodate itself more readily to inequalities of surface than those heretofore known or used.

To these ends my invention consists in certain novel features of construction fully illustrated in the accompanying drawings and described in this specification.

Figure 1:
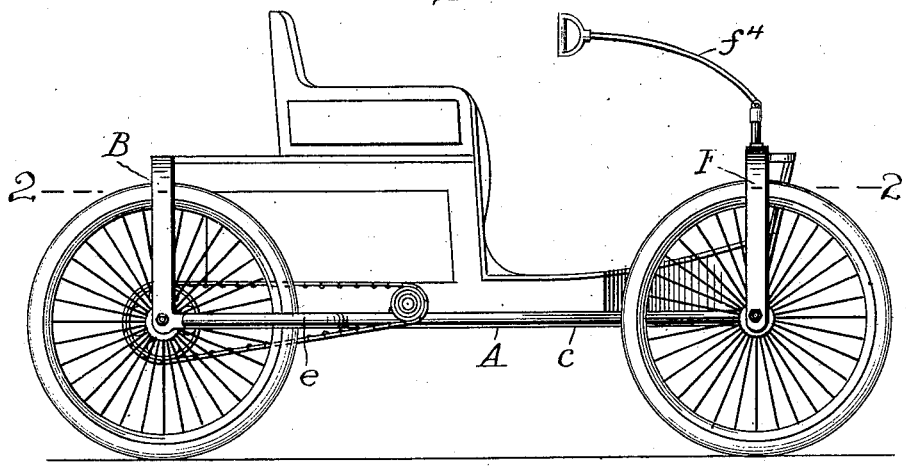
Figure 2:
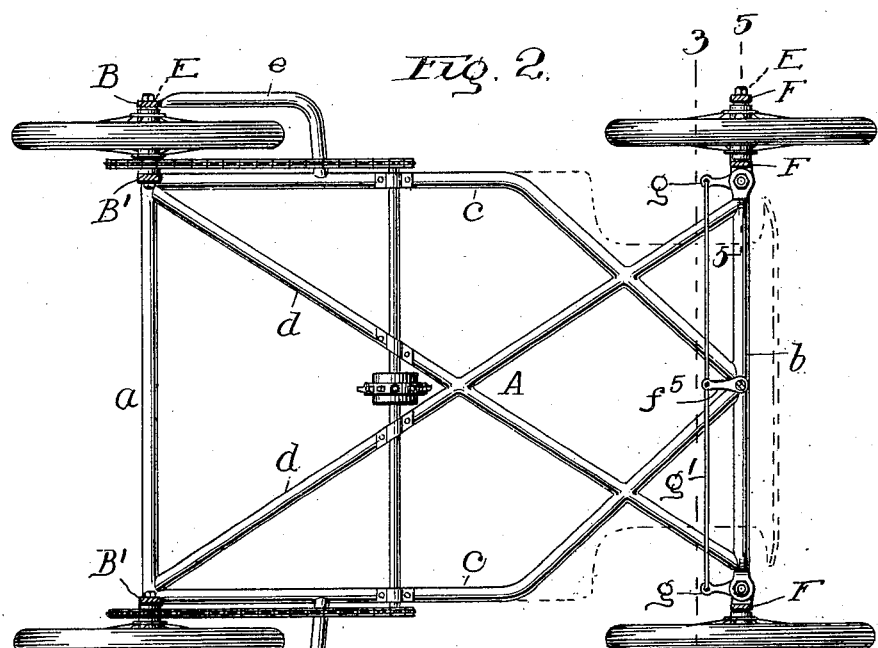

In said drawings, Figure 1 is a side elevation of an automobile provided with my improved running-gear. Fig. 2 is a plan view of said gear, the body of the vehicle being removed, in the line 2 2 of Fig. 1. Fig. 3 is a cross-section in the line 3 3 of Fig. 2, showing the operation of the steering mechanism. Fig. 4 is a rear elevation of the automobile having my improved gear; and Fig. 5 is a cross-section of a preferred form of hub, the hub and front wheel being swiveled in the line 5 5 of Fig. 2.

Referring to the drawings, A represents the frame of the machine, composed of the rear bar $a$, the front bar $b$, two side bars $c$, curved as shown in Fig. 2 and meeting the bar $b$ substantially at its center, and two diagonal bars $d$, extending from corner to corner of said frame, as shown in Fig. 2. These bars, it will be seen, form a substantially rigid quadrangular frame. Two additional bars $e$ are attached to the side bars $c$, as shown, and extend outward and backward, so as to form therewith supports for the axles of the rear wheels. The rear wheels are mounted on these axles, as hereinafter described, and are thus supported in the spaces between the respective bars $e$ $c$. An arched bar B extends upward from the rear end of one bar $e$ outside of the corresponding wheel to a height some distance above the top of the wheel and thence completely across the vehicle and down outside of the opposite wheel to the corresponding end of the opposite bar $e$. This bar is braced by bars B′, extending upward from the ends of the rear bar $a$ and meeting the bar B, as shown, thus forming forks over the rear wheels. The bar B may be further stiffened by the two braces D, as shown. The front wheels are mounted on axles E, supported in forks F, each of said forks being provided with laterally-extending lugs $f$, which lie between corresponding jaws $b'$ $b^2$ on the end of the front bar $b$ and are connected therewith by a vertical pivot $f^3$. It will thus be seen that the front wheels are free to move independently with respect to the frame proper. Each of the forks F has an integral lug $g$ extending rearwardly from the inside member of said fork, the two lugs $g$ being connected by a rod $g'$, which of course keeps the two wheels parallel. This rod is attached at its center to a lever $f^5$, which is actuated by the steering mechanism $f^4$. (Shown in Fig. 1.)

Across the front end of the vehicle and held rigidly in place, either upon the dashboard of the box or by means of suitable braces, extends the bar J, perforated at the ends, these perforations being in line with the swivels upon the lower cross-bar. To these perforations are pivotally connected the forks F, as shown in Fig. 3. The connecting-bars from the forks may be formed as shown, where one of the side braces of the fork is inwardly prolonged to the pivotal point, or the forks may be made in one piece and provided at the top with inwardly-extending members, which are perforated to connect with the bar J. It will be seen that this method of construction greatly relieves the strain upon the swiveled points and makes a much stronger and more rigid frame.

In lieu of the springs ordinarily used in automobiles and carriages I have substituted springs applied to and acting independently upon the respective wheels, each wheel being thus subjected to independent downward thrust. Such a system produces a much easier riding vehicle than any of the forms commonly in use, for the reason that each wheel will accommodate itself to local inequalities that are in the roadway without affecting the position of the frame or body of the vehicle. This does away entirely or almost entirely with the side sway so common in ordinary vehicles.

It is obvious that the independent springs may be applied in various ways, and many forms of spring-hubs might be used to cushion the wheels independently; but I prefer to use the form shown in Fig. 5, which is substantially the spring-hub covered by my Letters Patent No. 656,905, dated August 28, 1900, and No. 663,047, dated December 4, 1900. This consists of the suitable axle E, having an upward bend at its center and lying within a suitable metal casing G, formed with a central depression G', adapted to hold the spring H. It will be seen that this form of hub is such that the axle can play vertically within the hub, and the wheel can therefore accommodate itself to any inequalities of roadway without communicating any jar or motion to the frame of the vehicle.

I realize that considerable variations may be made in the details of the construction thus described, and I do not intend to limit myself to the specific forms herein set forth, either in respect to the arrangement of the bars of the frame or in relation to the construction whereby the independent springs are applied to the wheels.

I claim as new and desire to secure by Letters Patent—

1. In a running-gear, the combination with a rigid quadrangular frame, of four wheels connected thereto substantially at the corners of said frame, and separate springs adapted to exert independent downward thrust on the several wheels with respect to said frame; substantially as described.

2. In a running-gear, the combination with a rigid quadrangular frame, of forks secured to said frame substantially at its angles, wheels mounted within said forks and separate springs adapted to exert an independent downward thrust upon said wheels with respect to said frame; substantially as described.

3. In a running-gear of the class described, the frame comprising the rigidly-connected front, rear, side and diagonal bars, the vertical forks rigidly attached to the ends of the rear bar, and the braces extending forward from the outer ends of said forks to the side bars; substantially as described.

4. In a vehicle-frame, the combination with a rigid quadrangular frame, of four wheels suitably secured at the corners of said frame, said wheels being provided with spring-hubs whereby independent downward thrust with reference to said frame is exerted upon said wheels; substantially as described.

5. In a running-gear, the combination with a frame having wheels suitably secured at the rear corners and forks swiveled at the front corners, of a bar rigidly mounted in place in line with the swivels and perforated at its ends, and suitable bars rigidly connected with the tops of said forks, said bars being pivoted in said perforations in the above-mentioned cross-bar; substantially as described.

6. In a running-gear, the combination with a suitable frame, suitable rear wheels properly connected therewith, and front forks swiveled at the front corners of said frame, of a cross-bar rigidly held in place in line with the above-mentioned swivels, said bar being adapted to be pivotally connected with said forks and to impart additional rigidity to them; substantially as described.

In witness whereof I have hereunto set my hand at Chicago, in the county of Cook and State of Illinois, this 10th day of December, A. D. 1901.

FRANK SCHMITZ.

Witnesses:
CHAS. O. SHERVEY,
S. BLISS.